United States Patent [19]
Mills

[11] Patent Number: 5,886,422
[45] Date of Patent: Mar. 23, 1999

[54] UNIVERSAL ELECTRIC POWER CONTROLLER

[75] Inventor: Andrew Mills, Alton, Canada

[73] Assignee: Spartec International Corporation, Mississauga, Canada

[21] Appl. No.: 902,894

[22] Filed: Jul. 30, 1997

[51] Int. Cl.[6] .................................................... H02J 1/10
[52] U.S. Cl. ............................................. 307/29; 307/38
[58] Field of Search .................................. 307/18, 25–29, 307/38, 40, 43, 69, 72–75, 82, 84

[56] References Cited

U.S. PATENT DOCUMENTS

| | | | |
|---|---|---|---|
| 3,842,249 | 10/1974 | Geyer et al. | 307/86 |
| 4,742,291 | 5/1988 | Bobier et al. | 307/66 |
| 4,920,476 | 4/1990 | Brodsky et al. | 364/140 |
| 5,381,554 | 1/1995 | Langer et al. | 307/38 |
| 5,499,187 | 3/1996 | Smith | 363/142 |
| 5,594,285 | 1/1997 | Wisbey et al. | 307/18 |

*Primary Examiner*—Matthew Nguyen
*Attorney, Agent, or Firm*—Harris Beach & Wilcox LLP.

[57] ABSTRACT

An electrical power supply and controller for supplying electrical power from a common platform in a plurality of distinct electrical waveforms, including voltages, and frequency, and to a plurality of distinct loads including distinct motor loads, and controlling alternatively the speed and torque of these motor loads. The power supply and controller of this invention automatically accepts and adjusts to an electrical input across a wide range of electrical waveforms, including voltage and frequency, and includes an interface for accepting a plurality of distinct computer programs for controlling each load type. The electrical power supply and controller supplies electrical power to the plurality of distinct load modules, accepts the plurality of distinct electrical inputs, and accepts the plurality of distinct computer programs without any modification to the electrical power supply and controller itself.

30 Claims, 4 Drawing Sheets

UNIVERSAL ELECTRIC POWER CONTROLLER

BACKGROUND OF THE INVENTION

This invention relates in general to an electric power controller for providing electrical power to an electrical load, and more particularly to a universal controller that accepts any one of a variety of different input voltage waveforms, magnitudes, and frequencies, and, under computer program control, provides a controllable output voltage to any one of a variety of different electrical loads that include, among others, AC and DC motors.

Electrically powered devices have a wide variety of voltage, current and control requirements. Some types of electrically powered devices require an AC operating voltage having a fixed frequency and a fixed magnitude. Others require an AC operating voltage having a fixed magnitude and a variable frequency or an AC voltage having a variable magnitude and a fixed frequency. Similarly, some types of electrically powered devices require a DC voltage having a fixed or variable magnitude and/or a polarity that can be reversed. In many cases, these devices can be operated by a DC voltage which can be chopped or pulse width modulated. Still other types of electrically powered devices, such as AC/DC motors, can operate from AC or DC sources.

Electrical power sources also have a wide variety of types. Some types of power sources provide single or multiple phase AC voltages and currents at fixed frequencies and magnitudes. Fixed frequency AC sources typically provide a selectable one of a plurality of frequencies, 50 Hz single and multiple phase AC voltages being widely used in Europe, while 60 Hz single and multiple phase AC voltages are widely used in North America. Depending only on the application, AC sources typically provide a selectable one of a plurality of magnitudes, such as 220 or 440 volts, among others. Similarly DC power sources come in a variety of different types having different magnitudes and reversible or non-reversible polarities. Some DC sources, such as batteries, provide a virtually ripple free DC voltage having a fixed magnitude. Others, such as DC to DC converters are able to operate from variable magnitude DC input voltages or to provide variable magnitude DC output voltages.

Prior to the present invention, it was common to deal with these differing load requirements and source types by stocking a variety of different types of power conversion and control devices, including transformers, controlled rectifier devices, inverters, voltage regulators, DC to DC converters and various combinations thereof. With this approach, it was necessary to stock devices having various combinations of input and output voltage ranges. In applications involving the control of motors, this approach is made even more difficult by the fact that motors come in a variety of types having different input voltage and load current requirements and different control requirements. As a result, the task of designing and stocking power conversion and control devices that are dedicated to operating with each of a variety of different types of motors and each of a variety of different types of power sources is a daunting and expensive one.

It will therefore be seen that there exists a need for a power conversion and control device that is able to operate from any one of a variety of different types and magnitudes of power sources and to meet the power and control requirements of any one of a variety of different types of loads.

SUMMARY OF THE INVENTION

In accordance with the invention, there is provided an electrical power conversion and control apparatus which is able to operate from any one of a plurality of different types of AC and DC power sources, and which is able to provide controllable operating power to any one of a plurality of different AC and DC loads having a variety of different power and control requirements.

It is a primary object of the present invention to provide an apparatus which can accommodate these different requirements, without requiring a rewiring of its internal power conversion circuitry, and without requiring the user to manually reprogram its control circuitry.

It is a further object of this invention to provide an electric power conversion and control device that is able to provide controllable operating power to a variety of different AC loads and DC loads, including but not limited to AC induction motors, flux vector AC motors, switched reluctance AC motors, DC motors, and brushless DC motors.

It is a still further object of this invention to provide an electric power conversion and control device that includes a plurality of standardized interfaces that allow the device to be reconfigured, without internal wiring changes, either automatically or by means of the plugging and unplugging of control modules.

Briefly stated, the power conversion and control device of the invention comprises an universal electrical power conversion and control platform that includes an input interface assembly for connection to any one of a variety of different types of input voltage sources, a load interface assembly for connection to any one of a variety of different types of loads, and a control interface connector for interchangeably accepting any one of a variety of different types of control units or program modules, preferably including a non-volatile flash memory, each control unit being specific to a respective type of load and/or a particular control requirement. The platform of the invention also includes an input rectifier network for converting the voltage at the input interface assembly into a DC voltage having a predetermined polarity, a switching network for converting the latter voltage to a voltage suitable for application to the load interface, and a programmable control device, responsive to feedback signals received from the load interface and program data received through the control interface, for controlling the magnitude, waveform and frequency of the voltage applied to the load. Finally, the platform of the invention includes a power supply for producing from the range of voltages at the input interface assembly, a relatively constant voltage for operating the internal circuitry of the platform.

The program stored in the ROM of each interchangeable control unit is adapted to cooperate with the program stored in the memory permanently built into the power conversion and control platform to control a corresponding load. As a result, the power conversion and control platform may be configured for operation with any specific load by plugging a corresponding load-specific program control unit into the memory interface connector.

The power conversion and control module accepts a variety of different voltage types, magnitudes, waveforms and frequencies, including DC, single phase AC, and three phase AC, without requiring changes in internal wiring. Similarly, the power conversion and control platform supplies a variety of controllable load voltages of different types, magnitudes, waveforms and frequencies, including DC, single phase AC and three phase AC, again without requiring changes in internal wiring. These loads may comprise AC loads or DC loads, including motors such as AC induction motors, flux vector AC motors, switched reluctance AC motors, DC motors, and brushless DC motors, among others While the power conversion and control platform of the invention most readily lends itself to use as a reconfigurable motor controller, it may also be used with other type of loads such as arc welders, and battery chargers.

The above, and other objects, features and advantages of the present invention will become apparent from the following description read in conjunction with the accompanying drawings, in which similar reference numerals designate similar elements.

DETAILED DESCRIPTION OF THE PREFERRED EMBODIMENT

Figure 1:
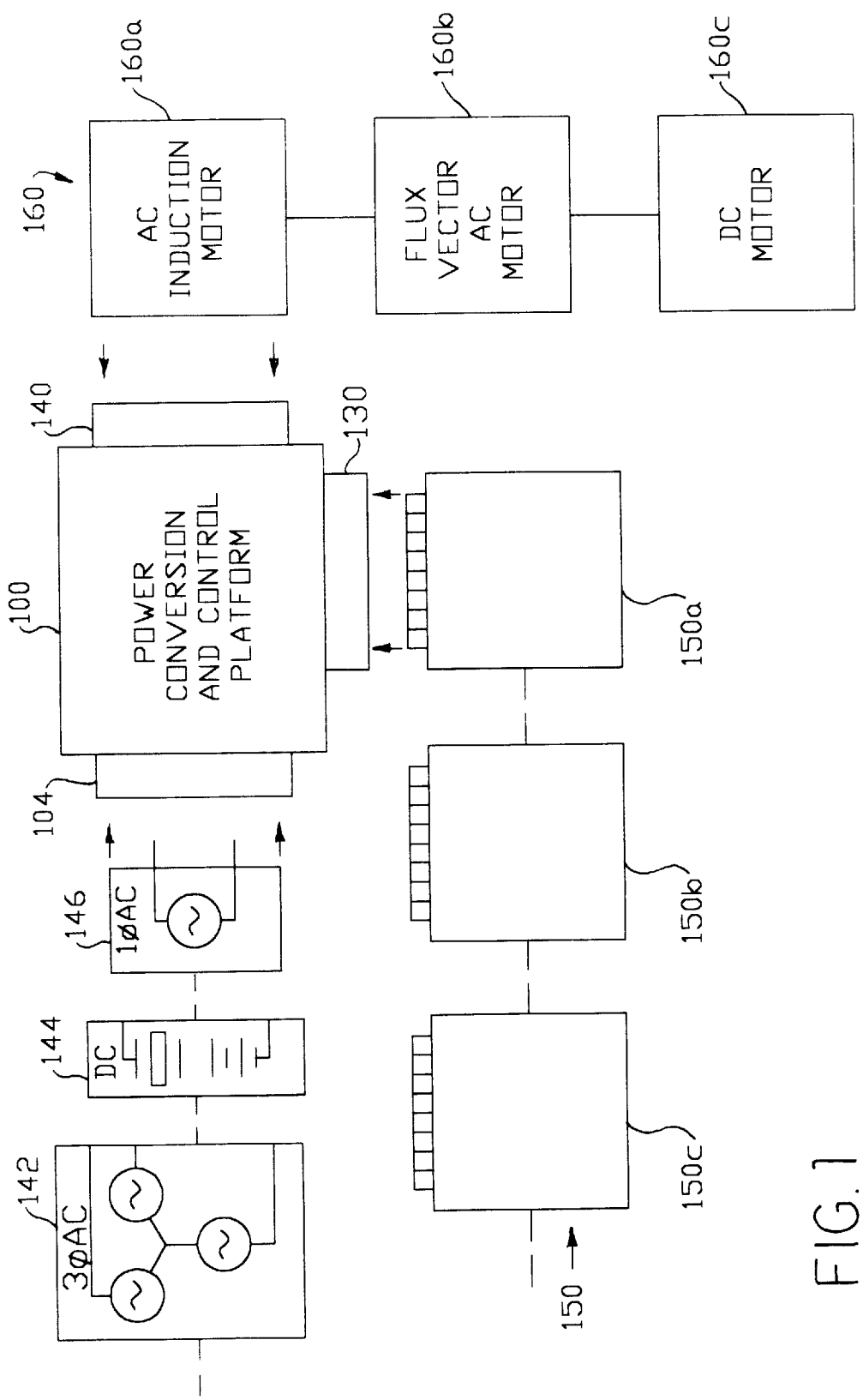
FIG. 1 is a block diagram of a power conversion and control platform constructed in accordance with the invention, together with examples of different input electrical power sources, loads, and load-specific program memories with which it may be used.

Referring to FIG. 1, there is shown a power conversion and control platform 100 constructed in accordance with the present invention. Platform 100 accepts input voltages having a variety of different types, waveforms, magnitudes, and frequencies and, in a manner to be described presently with reference to FIG. 3, automatically converts these inputs to output voltages having a variety of different types, magnitudes, and frequencies for application to electrical loads, including electric motors, among others. The power conversion and control platform 100 serves to control the conversion of input power into output power and the application of that power to the load.

Power conversion and control platform 100 includes an input interface assembly 104 which is adapted to be connected to any one of a variety of different types of electrical power sources. In the preferred embodiment, these types include a 3ΦAC 142, a DC source 144, and a AC source 146. Each of these sources interfaces with specific respective power input terminals of the input interface assembly 104 in a manner that shall be described presently. The electrical conversion and control circuitry of the platform 100 converts the voltage received from these sources to a form and magnitude suitable for application to a load. Thus, input interface assembly 104, in conjunction with the internal electrical conversion circuitry of platform 100, serve as a common platform for supplying electrical power to a load.

The power conversion and control module 100 supplies the converted output power to a plurality of different load modules 160, including an AC load and a DC load. The AC load includes motors such as an AC induction motor 160a, a flux vector AC motor 160b, a switched reluctance AC motor (not shown). The DC load includes motors such as a DC motor 160c, and a brushless DC motor (not shown). The power conversion and control module 100 includes a load interfacing assembly 140 that itself includes numerous standardized interfacing assembly terminals, described presently, for direct electrical connection to the plurality of different supported load modules 160, without any hardware changes to the power conversion and control platform 100. Thus, through a standardized interface and without a hardware configuration change to the power conversion and control platform 100, the power conversion and control platform 100 electrically connects to an AC electrical load, including an AC motor, and a DC electrical load, including a DC motor. The preferred embodiment of this invention accomplishes this connection via conventional plug in connectors in the case of low voltages and signals, and fastening connectors, such as studs and complementary lugs, in the case of power voltages. Thus, the load interfacing assembly 140 enables the power module 100 to serve as a common platform for supplying power to an open ended number of different load modules 160.

Power conversion and control platform 100 controls the conversion of the input electrical power into an output electrical power for any one of the plurality of load modules with which it may be used. Platform 100 includes a control or memory interface connector 130 that accepts any of a plurality of different control units 150, which include ROM memories, or other computer readable media. As will be explained more fully presently, these control units customize the power conversion and control platform 100 to serve as the power controller for a specific type of load. The specific computer programs and/or data, in conjunction with the control interface connector that accepts the control units on which the separate computer programs reside, enable the power conversion and control platform 100 to serve as a common platform to an open ended number of distinct load modules 160. The preferred control unit 150 media are PCMCIA style non-volatile flash memory modules. Three exemplary PCMCIA control units are shown, an AC induction motor control unit 150a, a flux vector AC motor control unit 150b, and a DC motor control unit 150c. Such control units are commercially available from Spartec International Corporation of Mississauga, Ontario, Canada, under part numbers SA00598, SA00602 and SA00599, respectively. It is understood that the control interface connector 130 may alternatively accept an input from a computer readable media that transmits the load module specific computer programs and/or data.

Figure 2A:
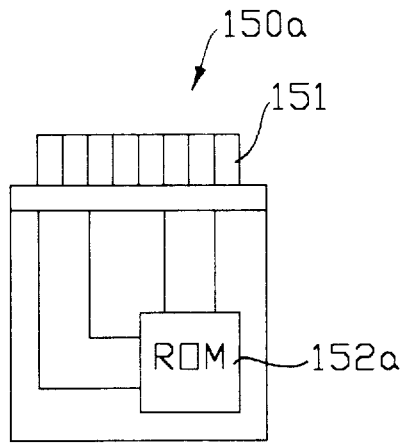
FIGS. 2a, 2b and 2c are block-schematic diagrams of exemplary loadspecific control units that may be used with the present invention.
Figure 2B:
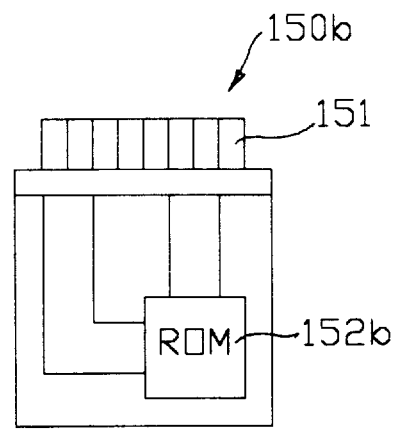
Figure 2C:
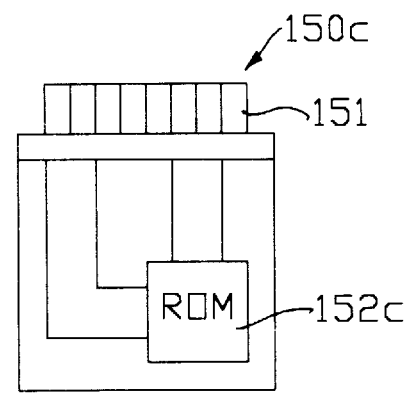

Referring to FIGS. 2a, 2b, and 2c, there are shown block-schematic diagrams of the three exemplary control units 150a, 150b and 150c, respectively, of FIG. 1. Each of these control units comprises a card-like substrate that includes a plug-in connector 151 having a standardized pin configuration which is compatible with the standardized configuration of memory interface connector 130 of platform 100. Control units 150a, 150b, and 150c also include respective ROM chips 152a, 152b and 152c, each of which contains program data which is specific to the type of load with which it is used. In operation, the load-specific program data stored in these control units works with the load-independent program data of platform 100 to define a complete program which meets the waveform, control and other requirements of the load with which it is used.

Figure 3:
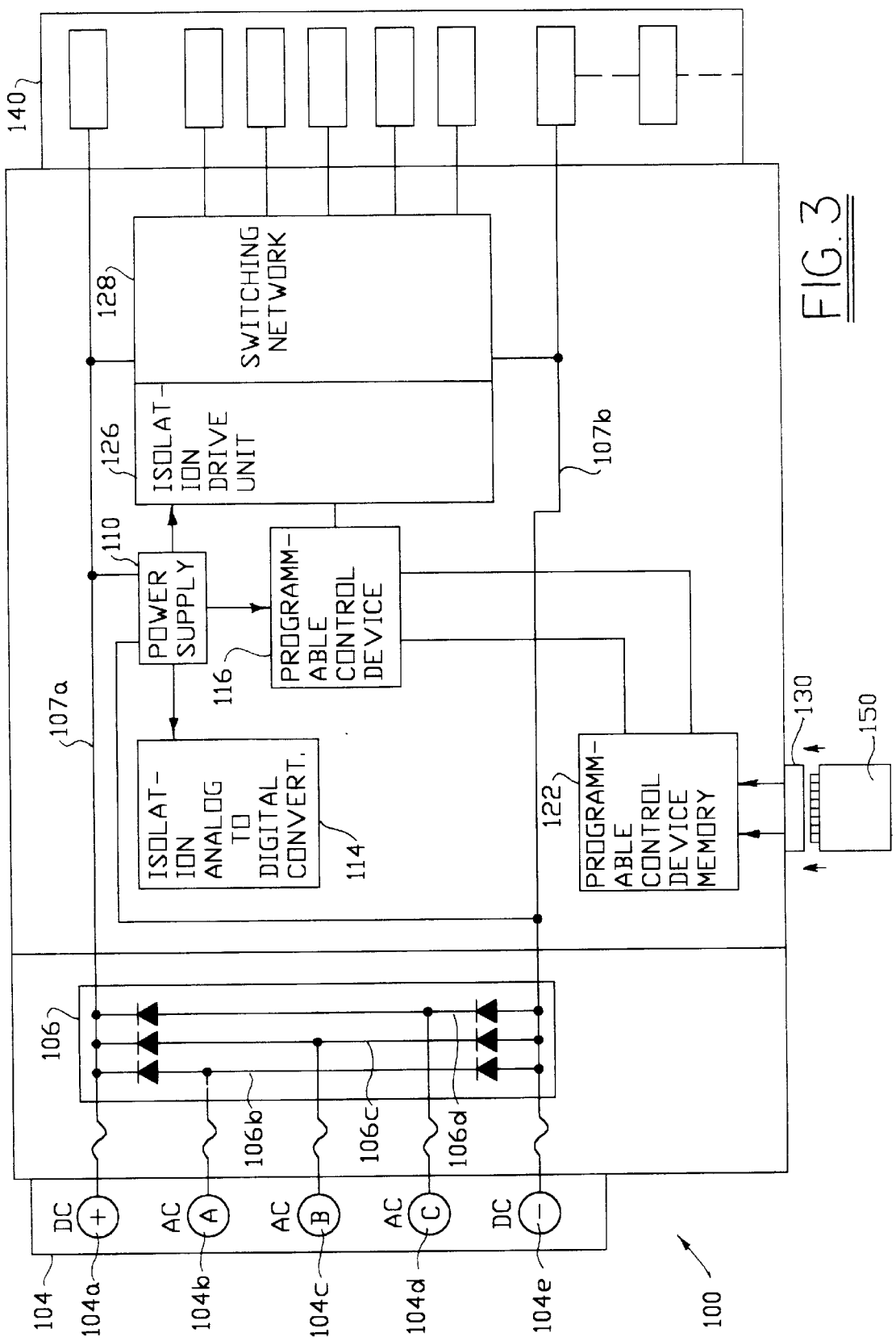
FIG. 3 is a block diagram of the power conversion and control platform of the invention.

Referring to FIG. 3, the separate units of the power conversion and control module 100 are enumerated for the sake of clarity. The power conversion and control module 100 includes the input interface assembly 104, the control interface connector 130, the load interfacing assembly 140, the input power section rectifier network 106, the internal power supply 110, the analog to digital converter unit 114, the programmable control device 116, the programmable control device memory (random access memory (RAM) and read only memory (ROM)) 122, the isolation drive unit 126, and the switching network (or inverter device) 128.

The electrical source connects to the power conversion and control module by connection to the input interface assembly 104. The outputs of the input interface assembly electrically connect to the input power section rectifier bridge 106, described presently. The outputs of the input power section rectifier bridge 106 is positive power buss 107a that electrically connects to the first input terminal of the internal power supply unit 110, the first input terminal of the switching network 128, and an interfacing assembly terminal of the load interfacing assembly 140.

A positive terminal of a DC source connects to individual power input terminal 104a. Power terminal 104a is electrically connected to the input power section rectifier network 106 in such a way that DC input current flows directly between power input terminal 104a and positive power buss 107a. The diodes of the input power section bridge 106 prevent the current from flowing through the rectification circuitry of the input power section bridge 106 and to power terminal 104e that connects to a negative terminal of the DC source. Similarly, a negative terminal of the DC source connects to individual power input terminal 104e so that DC current flows directly from a negative power buss 107b that connects to a second terminal of the internal power supply unit 110, a second terminal of the switching network 128, and a terminal of the load interfacing assembly 140. In this way, the DC source directly connects via the input interface assembly 104 to the input terminals of the internal power supply unit 110, the switch section 128, and the load interfacing assembly 140.

The input power section rectifier network 106 provides full wave rectification of an input AC source. A first terminal of the AC source connects to one of individual power input terminals 104b, 104c, and 104d; and a second terminal of the AC source connects to one of the individual power input terminals 104b, 104c, and 104d distinct from the power input terminal that connects to the AC source first terminal. Power terminals 104b, 104c, and 104d each connect between the individual diodes of a separate respective semiconductor diode pair 106b, 106c, or 106d, oriented to provide rectification in the same direction. This diode arrangement provides conventional full wave rectification to the AC source voltage, and accordingly provides a DC voltage comprising a full wave AC rectified input between the first input and the second input terminals of the internal power supply unit 110, the first input and the second input terminals of the switching network 128, and a pair of terminals of the load interfacing assembly 140. As used herein, full wave rectification is the condition in which current flows in the same direction during both halves of the alternating input voltage, and is thus converted to a magnitude varying DC current. In this way, the AC voltage input is converted to a full wave rectified signal electrically connected to the input terminals of the internal power supply unit 110, the switch section 128, and the load interfacing assembly 140.

The input power section rectifier bridge 106 provides full wave rectification of source 3ΦAC similar to that provided to the source AC. Each of the three 3ΦAC inputs electrically connects to a distinct power input terminal 104b, 104c, or 104d, which respectively connect between the individual diodes of a separate semiconductor diode pair oriented to provide rectification in the same direction. A DC voltage comprising a full wave rectified input is provided between the first input and the second input terminals of the internal power supply 110, the first input and the second input terminals of the switching network 128, and a pair of terminals of the load interfacing assembly 140.

It is understood that there are alternative embodiments of the input interface assembly. As an example, the DC source voltage may connect to two of the three AC power input terminals 104b, 104c, and 104d, and transmit its voltage through a diode of each diode pair to the power busses 107a and 107b, obviating the need for power input terminals 104a and 104e. Alternatively, the input power rectifier network 106 may comprise active switching devices rather than the passive diode pairs disclosed herein. In such an embodiment, each source input may be electrically connected between a pair of complementary switches, such as an IGBT (insulated gate bipolar transistor) pair.

The internal power supply 110 functions as a DC to DC converter. The internal power supply 110 converts the voltage across the power busses 107a and 107b into an approximately constant DC appropriately lowered voltage for powering the electrical circuits of the power conversion and control platform 100. The input to the internal power supply 110 is the positive power buss 107a, carrying alternatively a DC full wave rectified voltage or the DC source voltage. The internal power supply converts these inputs into a power input for the programmable control device 116, the analog to digital converter unit 114 described presently, and the isolation drive unit 126 described presently. The internal power supply 110 accepts and responds automatically to variations of constant value DC that range across the acceptable magnitudes of power conversion and control module 100 source voltage magnitude, waveform, and frequency. The preferred internal power supply of this invention is commercially available form Spartec International Corporation of Mississauga, Ontario, Canada.

The programmable control device 116 under program control controls the individual switches of the switching network 128 by issuing control signals on output lines connected to the isolation drive unit 126. These control signals direct the opening and closing of the power buss voltage at times that produce the voltage output to a load module. The isolation drive unit interfaces directly with the switching network 128. The voltage output conforms to the required load module input voltage in terms of effective voltage magnitude, effective waveform, and effective frequency. In the preferred embodiment of this invention, the power output of the power conversion and control platform 100 is a pulse width modulated (PWM) signal. The switching network 128 is described presently. The programmable control device 116 includes a microprocessor controller. The preferred embodiment of the microprocessor controller is a 32 bit model MC68332 controller commercially available from the Motorola Corporation of Austin, Tex.

The programmable control device 116 receives signal input from the analog to digital converter unit 114, comprising digital representations of the buss voltage, buss current, and load module power input magnitudes. The programmable control device 116 receives additionally signals from an operator interface (not shown) regarding load module type, and control objectives. The operator interface comprises alternatively an Echelon® signal, an RS 232 signal, an RS 422 signal, and a display and keypad input signal. The programmable control device 116 receives additionally load feedback signals representative of a controlled load state from a powered load for determination of appropriate switching commands to the switching network 128. As an example, for a motor load, this feedback signal may comprise a quadrature encoder, position encoder, or tachometer inputs. Under program control, the programmable control device 116 calculates alternatively motor speed or motor torque as an independent variable in a programmed determination of the proper electrical power input to the load module. The programmable control device 116 monitors these parameters and, if necessary, modifies control program flow to affect the magnitude, waveform, and frequency of the switching network 128 voltage power output according to the input operator control objectives. The switch patterns are changed to maintain a desired output for a varying input.

The programmable control device 116 executes a program comprising a combination of a load and/or control objective portion specific that includes processing instructions and or data downloaded into the programmable control device's 116 memory via the control interface connector 130, and a non-load and/or non-control objective specific portion that may be permanently resident in the programmable control device memory 122. The load and/or control objective portion resides on non-volatile plug-in memory modules that may download into the programmable control device's 116 memory, and may preferably be written to. The preferred embodiment of this invention comprises the load and/or control objective specific portion of the program resident on PCMCIA style non-volatile flash memory 150 modules that are downloaded into RAM of the programmable control device memory executed in combination with the non-load and/or non-control objective specific portion of the program permanently resident on ROM of the programmable control device memory.

The programmable control device 116 may direct the switching network 128 to produce (through the isolation drive unit 126) a balanced three or single phase output of controlled frequency and voltage to a load module. In an uninterruptible power supply application, the voltage input to the power conversion and control module 100 is supplied from a battery charger/battery system. For the case of motor control, the AC output may drive an AC induction motor, a flux vector AC motor, and an alternately switched on and off AC voltage to a reluctance AC motor. The programmable control device 116 may direct (through the isolation drive unit 126) the switching network 128 to produce an output to control a motor braking resistor which may be required to absorb energy of an AC motor under certain conditions. Motor speed may be determined by position inputs from a quadrature encoder that is used to calculate the required voltage for the motor, providing precise control of the speed and torque produced by the motor.

The programmable control device 116 may direct the switching network 128 to produce (through the isolation drive unit 126) a DC output of controlled variable voltage. For the case of motor control, the DC output may drive a DC (brush) motor as well as a DC brushless motor. For a DC (brush) motor, a DC output is additionally provided to the field. The time switched on is proportional to voltage and thus controlled speed. The programmable control device 116 may direct (through the isolation drive unit 126) the switching network 128 to produce an output to control a braking resistor which may be required to absorb energy of the motor under certain conditions. Motor speed may be determined by position inputs from a quadrature encoder that is used to calculate the required voltage for the motor, providing precise control of the speed and torque produced by the motor. For the case of a brushless DC motor, a shaft position encoder connects to the programmable control device 116. The position encoder provides motor shaft position information for a DC commutation computation. The time switched on is proportional to both output voltage and speed.

The isolation drive unit 126 is powered by the internal power supply 110. The isolation drive unit conventionally receives input signals from the programmable control device 116 for controlling the switching network 128 switches, and accordingly conventionally sends drives signals to the switching network 128.

The switching network 128 is a conventional inverter switching network. It is composed of electronic switches that switch the DC voltage of the positive buss 107a on and off to produce a controlled effective voltage, waveform and frequency conforming to the load module requirements. The programmable control device 116 controls the switching characteristics as a function of operator input control objectives, and feedback from the load. The switches may be SCR (silicon controlled rectifier), MOSFET (metal oxide silicon field effect transistor), GTO (gate turn-off SCR), MCT (MOSFET controlled thyristor) or other appropriate devices. Preferably, the switches are IGBTs (insulated gate bipolar transistors). The preferred inverter of this invention is a PWM inverter of a kind that adjusts the frequency and voltage for a given waveform.

The analog to digital converter unit 114 is powered by the internal power supply 110. The input of the analog to digital converter unit 114 include the analog magnitudes of the input power buss and switching network 128 switches voltage. The analog to digital converter unit 114 conventionally converts these analog inputs into digital output signals for transmission to the programmable control device 116 where their values are independent variables in the determination of switching control signals to the switching network 128 switches.

Figure 4:
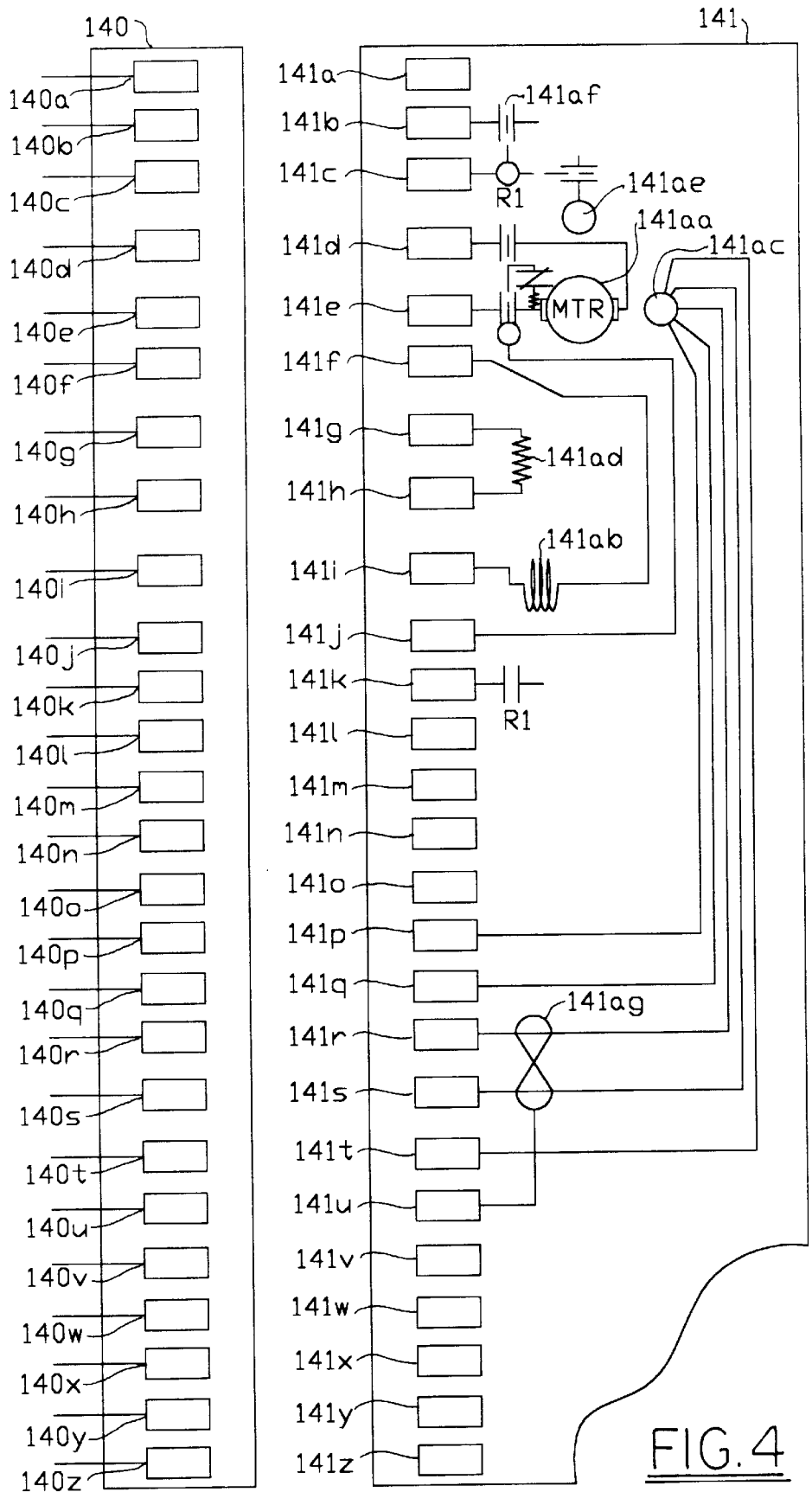
FIG. 4 is a block diagram of the load interfacing assembly of the invention together with an exemplary load comprising a DC motor.

Referring to FIG. 4, the load interfacing assembly 140 has interfacing assembly terminals 140a–140z for load module connection of all power and signal transmissions between the remainder of the power conversion and control module, and a load module 141, portrayed as a DC motor. The interfacing assembly terminals comprise terminals for voltage and signal output to a load module, and terminals for voltage and signal input to the remainder of the power conversion and control platform from a load module. Some interfacing assembly terminals are expansion terminals with no currently assigned inputs and outputs.

The load interfacing assembly presents a common interface to all load modules and enables the power conversion and control platform to function as a common platform for supplying power to an open ended number of distinct load modules, without any hardware changes. It is understood that the number of terminals may be expanded to accommodate future terminal requirements, and alternatively redesignated for a modified function. Each interfacing assembly terminal 140a–140z may connect to a load module via plug in cables. Interfacing terminals 140a–140z are to be connected to the corresponding terminals of a load module, 141a–141z, as appropriate. It is further understood that non-switching network power conversion and control platform outputs are conventionally provided and are consequently not specifically described.

Interfacing assembly terminal 140a directly connects to the positive buss of the power conversion and control platform and is available to connect the DC source voltage or alternatively the DC full wave rectified source voltage to a connecting load module. Similarly, interfacing assembly terminal 140i directly connects to the negative buss power conversion and control platform and is available as a negative connection. Interfacing assembly terminals 140d, 140e, and 140f provide switching network 128 voltage outputs to the load modules. Specifically, terminals 140d through 140f provide switching network 128 3-phase voltage outputs to a load module which, for the case of an AC induction motor, a flux vector AC motor, a switched reluctance motor, and a brushless DC motor is stator. Interfacing assembly terminals 140d and 140e provide switching network 128 DC effective voltage output, and in the case of a DC motor, armature voltage, while interfacing assembly terminal 140f, in combination with negative buss connection 140i, provides shunt field voltage to the DC motor. The connection to a DC motor 141aa is portrayed with the interfacing assembly terminals 140d and 140e connected respectively to DC motor terminals 141d and 141e which respectively connect to the armature (not shown) of DC motor 141aa. Interfacing assembly terminal 141f connects to the shunt field 141ab of DC motor 141aa. The output end of shunt field 141ab is connected via interfacing assembly terminal 141i to the negative power buss.

Interfacing assembly terminals 140r, 140s, and 140t are connections from the load to the programmable control device 116 that may include feedback signals and may accommodate a connection to a quadrature encoder for transmission of a load motor shaft position signal into the programmable control device 116 to enable the programmable control device 116 to determine motor speed. Interfacing assembly terminal 140u connects to a quadrature encoder shield input, providing shielding for the quadrature encoder. Interfacing assembly terminals 104p and 104q connect to an accessory load, and may provide a quadrature encoder input. In the portrayed DC motor 141aa, quadrature encoder signals derive from a connected quadrature encoder 141ac. Shield inputs connect to a quadrature encoder shield 141ag, and the accessory load input connects to the quadrature encoder 141ac. The interfacing assembly terminals 140m, 140n and 140o are connections from the load to the programmable control device 116 that may include feedback signals and may connect to motor position encoder, and transmit that signal to the programmable control device 116 to determine motor speed. Alternatively, a motor may include a tachometer, and output an (analog) tachometer signal. The interfacing assembly terminals 141v and 141w are connections from the load to the programmable control device 116 that may include feedback signals and may accommodate a connection to an AC tachometer, and interfacing assembly terminals 141y and 141z are connections from the load to the programmable control device 116 that may include feedback signals and may accommodate a connection to a DC tachometer. They each transmit that signal (over separate lines) to the programmable control device as an indication of motor speed. Interfacing assembly terminal 140x connects to a tachometer shield input, providing shielding for a tachometer.

Interfacing assembly terminals 140b and 140c provide respectively, a DC switch output that includes blower motor switch and a DC voltage output that includes a blower motor return input. In the portrayed DC motor 141aa, that blower motor switch 141af and blower motor 141ae are connected to interfacing assembly terminals 140b and 140c respectively. Interfacing assembly terminals 140g and 140h provide a braking resistor output from the switching network 128 to control a motor braking resistor to absorb energy from a running motor. The connection to a DC motor is portrayed with the interfacing assembly terminals 140g and 140h connected respectively to DC motor terminals 141g and 141h which respectively connect to the braking resistor 141ad.

Interfacing assembly terminal 104k provides an overload monitor input from a motor load to the power conversion and control platform 100 for control by the power conversion and control platform 100 of an overload contactor input from the power conversion and control platform 100 through the load interfacing assembly 140 to a connecting motor load for those motor load that are accordingly enabled. Interfacing assembly terminal 104j provides the overload contactor input to the motor load. Interfacing assembly terminal 104l is an auxiliary connector.

While the present invention has been described with reference to one or more specific embodiments, it will be understood that the time spirit and scope of the present invention should be determined only with reference to the appended claims.

What is claimed is:

1. In a power conversion and control apparatus for supplying operating voltage to a load which may be of any of a plurality of different types that require operating voltages having different respective waveforms and different respective magnitudes or frequencies, said power conversion and control apparatus being of the type having a plurality of power input terminals, a plurality of power output terminals for connection to said load, a switching network connected between said power input terminals and said power output terminals, and a programmable control circuit responsive to at least one feedback signal from said load and to a stored program for controlling said operating voltage, in combination:

a first program memory coupled to said programmable control circuit for storing a first portion of said stored program, said first portion including that portion of said stored program which is independent of the type of load that is connected to said power output terminals;

a memory interface connector coupled to said programmable control circuit for receiving any one of a plurality of different second program memories for storing a second portion of said stored program, each of said second portions corresponding to one of said plurality of types of load, and each being adapted to cooperate with said first program memory to control said one of said plurality of types of load, when said corresponding type of load is connected to said power output terminals;

whereby said power conversion and control apparatus may be configured for operation with any of said different types of load by connecting a corresponding second program memory to said memory interface connector.

2. A power conversion and control apparatus as set forth in claim 1 in which said power input terminals include a plurality of AC input terminals for connection to any one of a plurality of different types of AC sources and a plurality of DC input terminals for connection to at least one type of DC source.

3. A power conversion and control apparatus as set forth in claim 2 in which said power input terminals define an input interface assembly having a predetermined standardized format, whereby any one of a plurality of different types of AC and DC sources may be interchangeably connected to said switching network.

4. A power conversion and control apparatus as set forth in claim 1 in which said power input terminals include a plurality of AC power input terminals and DC power input terminals, further including a plurality of DC power busses, rectifying means for rectifying an AC input voltage appearing between said AC power input terminals and applying the rectified AC voltage to said DC power busses, and means for connecting said switching network between said DC power busses and said DC output terminals.

5. A power conversion and control apparatus as set forth in claim 1 further including a load interface assembly for detachably receiving any one of said plurality of different loads.

6. A power conversion and control apparatus as set forth in claim 5 in which said memory interface connector has a predetermined standardized format, whereby any of said plurality of different second program memories may be interchangeably received by said memory interface connector.

7. A power conversion and control apparatus as set forth in claim 5 in which said load interface assembly has a predetermined standardized format, whereby any of said loads may be interchangeably received by said load interface assembly.

8. A power conversion and control apparatus as set forth in claim 5 in which said load is a motor, in which said load interface assembly includes connectors for receiving feedback signals indicative of at least one of motor position, motor torque, and motor speed.

9. A power conversion and control apparatus as set forth in claim 1 in which said second portion of said stored program defines at least one of the waveform of the voltage to be applied to said load, the magnitude of the voltage to be applied to said load and the frequency of the voltage to be applied to said load.

10. A power conversion and control apparatus as set forth in claim 9 in which said voltage is a pulse width modulated voltage.

11. A power conversion and control apparatus as set forth in claim 1 in which said switching network comprises a multi phase switching circuit which is adapted to controllably provide either a chopped DC output voltage or a pulse width modulated AC output voltage.

12. A power conversion and control apparatus as set forth in claim 1 further including a pair of DC power busses, rectifying means for full wave rectifying an AC input voltage appearing between said AC power input terminals and applying the full wave rectified AC voltage to said DC power busses, and a DC to DC converter having an input connected to said power busses and an output connected to said programmable control circuit, said DC to DC converter serving as means for maintaining an approximately constant operating voltage for said programmable control circuit as the magnitude of said AC input voltage varies.

13. A power conversion and control apparatus as set forth in claim 1 in which said different types of loads include a plurality of types of DC motors and a plurality of types of AC motors.

14. A power conversion and control apparatus as set forth in claim 1 in which said different types of loads include at least one of a DC motor, a DC brushless motor module, an AC induction motor, a switched reluctance AC motor, and a 3ΦAC motor.

15. A power conversion and control apparatus as set forth in claim 1 in which said first program memory is a read write memory.

16. A power conversion and control apparatus as set forth in claim 15 in which said second program memory includes a non-volatile memory.

17. In a power conversion and control apparatus for supplying a controllable operating voltage from a selected one of an AC source and a DC source to a load, in combination:
a set of AC and DC power input terminals;
a set of power output terminals for connection to a load module of any one of a plurality of different types, said types having different respective operating voltage and control requirements;
a power buss;
rectifying means for connecting said AC and DC power terminals to said power buss;
switching means for controllably connecting said power buss to said power output terminals and thereby providing an operating voltage to said load module;
processing means responsive to a stored program for controlling the switching activity of said switching means;
a built in memory for storing a first segment of said stored program, said segment being independent of the type of load module connected to said output terminals;
a plug in memory for storing a second segment of said stored program, said second segment being specific to the type of load module connected to said output terminals; and
a memory interface for connecting said plug in memory to said processing means.

18. A power conversion and control apparatus as set forth in claim 17 wherein said AC source includes one of a plurality of different types of AC sources, and said DC source includes one of a plurality of different types of DC sources.

19. A power conversion and control apparatus as set forth in claim 17 wherein said AC and DC power input terminals define an input interface assembly wherein any of a plurality of different types of AC and DC sources may be interchangeably connected to said programmable conversion and control apparatus.

20. A power conversion and control apparatus as set forth in claim 17 wherein said power output terminals define a load interface assembly having a standardized format, wherein any of a plurality of different types of load modules may be interchangeably connected to said programmable conversion and control apparatus.

21. A power conversion and control apparatus as set forth in claim 17 wherein said types of load modules include at least one of a DC motor, a DC brushless motor, an AC motor, a flux vector AC motor, and a switched reluctance AC motor.

22. A power conversion and control apparatus as set forth in claim 17 wherein said load module is a motor module; in which said power output terminals include terminals for receiving feedback signals indicative of at least one of motor position, motor torque, and motor speed.

23. A power conversion and control apparatus as set forth in claim 17 wherein said second program segment defines at least one of the waveform of the voltage to be applied to said load module, the magnitude of the voltage to be applied to said load module, and the frequency of the voltage to be applied to said load module.

24. A power conversion and control apparatus as set forth in claim 17 wherein said switching means is adapted to establish a pulse width modulated voltage at said power output terminals.

25. A power conversion and control apparatus as set forth in claim 17 in which said switching means comprises a multi phase switching circuit which is adapted to controllably provide either a dropped DC voltage or a pulse width modulated AC voltage at said power output terminals.

26. A power conversion and control apparatus as set forth in claim 17 further including an internal power supply for maintaining an approximately constant operating voltage for said processing means as the magnitude of said AC input voltage varies, said internal power supply having an input connected to said power buss.

27. A power conversion and control apparatus as set forth in claim 17 in which said different types of load modules include at least one of a plurality of types of DC motors, and at least one of a plurality of types of AC motors.

28. A power conversion and control apparatus as set forth in claim 17 in which said memory interface has a predetermined standardized format, whereby any of a plurality of different plug in modules may be interchangeably connected to said processing means.

29. A power conversion and control apparatus as set forth in claim 17 in which said built in memory is a read write memory.

30. A power conversion and control apparatus as set forth in claim 29 in which said plug in memory includes a flash memory.

* * * * *